（12）United States Patent
Xu et al.

(10) Patent No.: US 11,126,888 B2
(45) Date of Patent: Sep. 21, 2021

(54) TARGET RECOGNITION METHOD AND APPARATUS FOR A DEFORMED IMAGE

(71) Applicant: HANGZHOU HIKVISION DIGITAL TECHNOLOGY CO., LTD., Hangzhou (CN)

(72) Inventors: Yunlu Xu, Hangzhou (CN); Gang Zheng, Hangzhou (CN); Zhanzhan Cheng, Hangzhou (CN); Yi Niu, Hangzhou (CN)

(73) Assignee: HANGZHOU HIKVISION DIGITAL TECHNOLOGY CO., LTD, Hangzhou (CN)

( * ) Notice: Subject to any disclaimer, the term of this patent is extended or adjusted under 35 U.S.C. 154(b) by 33 days.

(21) Appl. No.: 16/622,197

(22) PCT Filed: Jun. 12, 2018

(86) PCT No.: PCT/CN2018/090826
§ 371 (c)(1),
(2) Date: Dec. 12, 2019

(87) PCT Pub. No.: WO2018/228375
PCT Pub. Date: Dec. 20, 2018

(65) Prior Publication Data
US 2020/0134366 A1 Apr. 30, 2020

(30) Foreign Application Priority Data
Jun. 16, 2017 (CN) .......................... 201710457725.7

(51) Int. Cl.
*G06K 9/62* (2006.01)
*G06K 9/46* (2006.01)
(52) U.S. Cl.
CPC ......... *G06K 9/6249* (2013.01); *G06K 9/4633* (2013.01); *G06K 9/6267* (2013.01)

(58) Field of Classification Search
CPC ... G06K 9/6249; G06K 9/4633; G06K 9/6267
See application file for complete search history.

(56) References Cited

U.S. PATENT DOCUMENTS 9,858,496 B2 *  1/2018  Sun ...................... G06K 9/3233
9,892,301 B1 *  2/2018  Holub .................... G06T 1/005
(Continued)

FOREIGN PATENT DOCUMENTS

CN   104298976   1/2015
CN   105740909   7/2016
(Continued)

OTHER PUBLICATIONS

Szegedy et al., 2014, "Going deeper with convolutions" (pp. 1-12). (Year: 2014).*

(Continued)

*Primary Examiner* — Manav Seth
(74) *Attorney, Agent, or Firm* — Norton Rose Fulbright US LLP

(57) ABSTRACT

An object recognition method and apparatus for a deformed image are provided. The method includes: inputting an image into a preset localization network to obtain a plurality of localization parameters for the image, wherein the preset localization network comprises a preset number of convolutional layers, and wherein the plurality of localization parameters are obtained by regressing image features in a feature map that is generated from a convolution operation on the image; performing a spatial transformation on the image based on the plurality of localization parameters to obtain a corrected image; and inputting the corrected image into a preset recognition network to obtain an object classification result for the image. In the process of the neural network based object recognition, the embodiment of the present application first transforms the deformed image that (Continued)

has deformation, and then performs the object recognition on the transformed image.

12 Claims, 4 Drawing Sheets

(56) References Cited

U.S. PATENT DOCUMENTS

| | | | |
|---|---|---|---|
| 10,032,089 B2 * | 7/2018 | Jaderberg | G06N 3/084 |
| 10,426,442 B1 * | 10/2019 | Schnorr | A61B 8/0866 |
| 2006/0182365 A1 | 8/2006 | Park et al. | |
| 2012/0275690 A1 * | 11/2012 | Melvin | G06K 9/00979 |
| | | | 382/156 |
| 2021/0034909 A1 * | 2/2021 | Jaderberg | G06N 3/084 |

FOREIGN PATENT DOCUMENTS

| | | |
|---|---|---|
| CN | 106599878 | 4/2017 |
| CN | 106778659 | 5/2017 |
| CN | 106778737 | 5/2017 |
| CN | 106845487 | 6/2017 |
| WO | WO 2016/197046 | 12/2016 |

OTHER PUBLICATIONS

Extended European Search Report issued in Corresponding European Application No. 18817876.8, dated May 12, 2020.
Office Action issued in corresponding Chinese Application No. 201710457725.7, dated Mar. 2, 2020 (English Translation Provided).
International Search Report and Written Opinion in corresponding International Patent Application No. PCT/CN2018/090826, dated Sep. 12, 2018 (English Translation of International Search Report provided).

* cited by examiner

TARGET RECOGNITION METHOD AND APPARATUS FOR A DEFORMED IMAGE

CROSS-REFERENCE TO RELATED APPLICATIONS

The present application is a national phase under 35 U.S.C. § 371 of International Application No. PCT/CN2018/090826, filed Jun. 12, 2018, which claims the priority of a Chinese Patent Application No. 201710457725.7, filed with the China National Intellectual Property Administration on Jun. 16, 2017 and entitled "Object Recognition Method and Apparatus for Deformed Image", the entire contents of each of which are incorporated herein by reference in their entirety.

TECHNICAL FIELD

The present application relates to the field of image recognition, in particular to an object recognition method and apparatus for a deformed image.

BACKGROUND

With the development of neural network technology, object recognition technology for images has been developed rapidly. An object recognition algorithm based on a neural network utilizes the active learning capability of the neural network, and extracts image features to obtain results in classification of an object, i.e., object recognition results. Compared with traditional object recognition algorithms, such algorithm can improve the accuracy of object recognition and recognize objects of more types, such as people, animals, plants, buildings, vehicles, characters and the like.

Existing object recognition algorithms based on a neural network perform object recognition using a deep neural network model. However, the object recognition does not taken into account deformation of objects that may be caused by photographing or other reasons in complex scenes and that would affect the object recognition results. The deformation may include, for example, tilt, scaling and perspective transformation of an object due to the change in the angle of view during image shooting; or deformation of an object made on purpose, such as, in character recognition, tilt and distortion of characters depending on font designs and changes. For deformed images, the existing object recognition algorithms based on a neural network directly classifies objects with large deformations, which results in a low accuracy of object recognition.

SUMMARY

The objective of embodiments of the present application is to provide an object recognition method and apparatus for a deformed image, which can improve the accuracy of object recognition for the deformed image. The specific technical solutions are illustrated as follows.

In an aspect, an embodiment of the present application discloses an object recognition method for a deformed image, including:

inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image;

performing a spatial transformation on the image based on the plurality of localization parameters to obtain a corrected image; and inputting the corrected image into a preset recognition network to obtain an object classification result for the image.

Optionally, inputting the image into the preset localization network to obtain the plurality of localization parameters for the image, includes:

performing a feature extraction on the image using the preset number convolutional layers to generate the feature map containing the image features of the image; and regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

Optionally, performing the spatial transformation on the image based on the plurality of localization parameters to obtain the corrected image, includes:

determining a spatial transformation relationship for the reference points from the image to the corrected image, based on the localization parameters corresponding to the preset number of reference points and coordinates of the preset number of reference points in the corrected image; and obtaining respective coordinates in the corrected image for all pixels of the image based on the spatial transformation relationship to obtain the corrected image.

Optionally, determining the spatial transformation relationship for the reference points from the image to the corrected image, based on the localization parameters corresponding to the preset number of reference points and the coordinates of the preset number of reference points in the corrected image, includes:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm includes one of an affine transformation algorithm, a perspective transformation algorithm or a thin plate spline transformation algorithm; and wherein obtaining the respective coordinates in the corrected image for all pixels of the image based on the spatial transformation relationship to obtain the corrected image, includes:

calculating, from coordinates of all the pixels of the image, the respective coordinates in the corrected image for all the pixels, by using the preset transformation algorithm with the transformation parameters to obtain the corrected image.

Optionally, inputting the corrected image into the preset recognition network to obtain the object classification result for the image, includes:

performing feature extraction on the corrected image using convolutional layers in the preset recognition network to generate a feature map containing image features of the corrected image; and classifying the image features in the feature map of the corrected image using a fully connected layer in the preset recognition network to obtain the object classification result for the image.

In another aspect, an embodiment of the present application further discloses an object recognition apparatus for a deformed image, including:

a localization module, configured for inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image;

a spatial transformation module, configured for performing a spatial transformation on the image based on the plurality of localization parameters to obtain a corrected image; and a recognition module, configured for inputting the corrected image into a preset recognition network to obtain an object classification result for the image.

Optionally, the localization module includes:

an feature map obtaining submodule, configured for performing a feature extraction on the image using the preset number convolutional layers to generate the feature map containing the image features of the image; and a localization submodule, configured for regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

Optionally, the spatial transformation module includes:

a transformation relationship obtaining submodule, configured for determining a spatial transformation relationship for the reference points from the image to the corrected image, based on the localization parameters corresponding to the preset number of reference points and coordinates of the preset number of reference points in the corrected image; and a correction submodule, configured for obtaining respective coordinates in the corrected image for all pixels of the image based on the spatial transformation relationship to obtain the corrected image.

Optionally, the transformation relationship obtaining submodule is specifically configured for:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm includes one of an affine transformation algorithm, a perspective transformation algorithm or a thin plate spline transformation algorithm; and the correction submodule is specifically configured for:

calculating, from coordinates of all the pixels of the image, the respective coordinates in the corrected image for all the pixels, by using the preset transformation algorithm with the transformation parameters to obtain the corrected image.

Optionally, the recognition module includes:

a feature map obtaining submodule, configured for performing feature extraction on the corrected image using convolutional layers in the preset recognition network to generate a feature map containing image features of the corrected image; and a classification submodule, configured for classifying the image features in the feature map of the corrected image using a fully connected layer in the preset recognition network to obtain the object classification result for the image.

To achieve the above objective, an embodiment of the present application further discloses an electronic device including:

a memory configured to store a computer program; and a processor configured to execute the computer program stored in the memory to carry out operations including:

inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image;

performing a spatial transformation on the image based on the plurality of localization parameters to obtain a corrected image; and inputting the corrected image into a preset recognition network to obtain an object classification result for the image.

Optionally, inputting the image into the preset localization network to obtain the plurality of localization parameters for the image, includes:

performing a feature extraction on the image using the preset number convolutional layers to generate the feature map containing the image features of the image; and regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

Optionally, performing the spatial transformation on the image based on the plurality of localization parameters to obtain the corrected image, includes:

determining a spatial transformation relationship for the reference points from the image to the corrected image, based on the localization parameters corresponding to the preset number of reference points and coordinates of the preset number of reference points in the corrected image; and obtaining respective coordinates in the corrected image for all pixels of the image based on the spatial transformation relationship to obtain the corrected image.

Optionally, determining the spatial transformation relationship for the reference points from the image to the corrected image, based on the localization parameters corresponding to the preset number of reference points and the coordinates of the preset number of reference points in the corrected image, includes:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm includes one of an affine transformation algorithm, a perspective transformation algorithm or a thin plate spline transformation algorithm; and wherein obtaining the respective coordinates in the corrected image for all pixels of the image based on the spatial transformation relationship to obtain the corrected image, includes:

calculating, from coordinates of all the pixels of the image, the respective coordinates in the corrected image for all the pixels, by using the preset transformation algorithm with the transformation parameters to obtain the corrected image.

Optionally, inputting the corrected image into the preset recognition network to obtain the object classification result for the image, includes:

performing feature extraction on the corrected image using convolutional layers in the preset recognition network to generate a feature map containing image features of the corrected image; and classifying the image features in the feature map of the corrected image using a fully connected layer in the preset recognition network to obtain the object classification result for the image.

To achieve the above objective, an embodiment of the present application further discloses a computer readable storage medium having a computer program stored thereon which, when executed by a processor, cause the processor to carry out the operations including: inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image;

performing a spatial transformation on the image based on the plurality of localization parameters to obtain a corrected image; and inputting the corrected image into a preset recognition network to obtain an object classification result for the image.

Optionally, inputting the image into the preset localization network to obtain the plurality of localization parameters for the image, may include:

performing a feature extraction on the image using the preset number convolutional layers to generate the feature map containing the image features of the image; and regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

Optionally, performing the spatial transformation on the image based on the plurality of localization parameters to obtain the corrected image, may include:

determining a spatial transformation relationship for the reference points from the image to the corrected image, based on the localization parameters corresponding to the preset number of reference points and coordinates of the preset number of reference points in the corrected image; and obtaining respective coordinates in the corrected image for all pixels of the image based on the spatial transformation relationship to obtain the corrected image.

Optionally, determining the spatial transformation relationship for the reference points from the image to the corrected image, based on the localization parameters corresponding to the preset number of reference points and the coordinates of the preset number of reference points in the corrected image, may include:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm includes one of an affine transformation algorithm, a perspective transformation algorithm or a thin plate spline transformation algorithm; and wherein obtaining the respective coordinates in the corrected image for all pixels of the image based on the spatial transformation relationship to obtain the corrected image, may include:

calculating, from coordinates of all the pixels of the image, the respective coordinates in the corrected image for all the pixels, by using the preset transformation algorithm with the transformation parameters to obtain the corrected image.

Optionally, inputting the corrected image into the preset recognition network to obtain the object classification result for the image, may include:

performing feature extraction on the corrected image using convolutional layers in the preset recognition network to generate a feature map containing image features of the corrected image; and classifying the image features in the feature map of the corrected image using a fully connected layer in the preset recognition network to obtain the object classification result for the image.

In the embodiments of the object recognition method for a deformed image and of the object recognition apparatus for a deformed image provided herein, an image is first input into a preset localization network to obtain a plurality of localization parameters for the image. The localization network includes a preset number of convolutional layers, which are obtained by regressing image features in a feature map that is generated by a convolution operation on the image. Then, a spatial transformation is performed on the image based on the plurality of localization parameters to obtain a corrected image. Finally, the corrected image is input into a preset recognition network to obtain an object classification result for the image. In the process of the neural network based object recognition, the embodiment of the present application first corrects the deformation of the deformed image, and then performs the object recognition on the corrected image. This can reduce the interference of the deformation on the object recognition, and therefore improve the accuracy of the object recognition for a deformed image. Of course, a product or method for implementing the techniques disclosed in the present application does not necessarily have all the advantages mentioned above.

BRIEF DESCRIPTION OF DRAWINGS

In the following, a brief description of the appended drawings is given for illustrating the embodiments of the present application and technical solutions in the prior art more clearly. It is obvious that the drawings are for only some embodiments of the present application. Those skilled in the art can also obtain further drawings based on drawings herein without any creative efforts.

DETAILED DESCRIPTION

Figure 1:
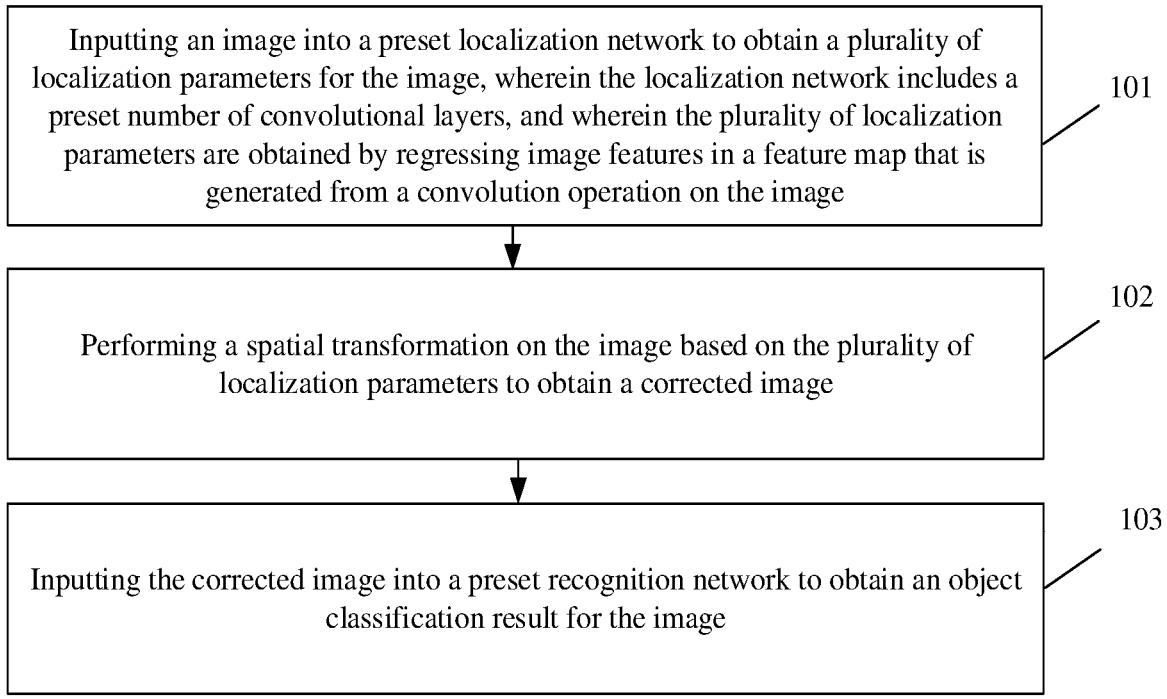
FIG. 1 is a flowchart of an object recognition method for a deformed image according to an embodiment of the present application.

To make the objectives, technical solutions and advantages of the present application more clear, a detailed description of the present application will be provided below with reference to the drawings and in association with embodiments. Obviously, the illustrated embodiments are only some rather than all embodiments of the present application. Any other embodiments obtained based on the embodiments herein by those skilled in the art without any creative efforts fall into the protection scope defined by the present application.

The present application discloses embodiments of an object recognition method and apparatus for a deformed image, which can improve the accuracy of object recognition for the deformed image.

Embodiments of the object recognition method for a deformed image will be first introduced below.

The development of neural networks greatly improves the accuracy of object recognition. The object recognition technology based on a neural network is widely used in many fields, such as the intelligent monitoring field, character recognition field, and the like.

In the object recognition technology based on a neural network, the neural network established in advance is firstly trained with a large number of image samples and known object recognition results for the image samples. With the active learning capability of the neural network, image features of the image samples are extracted to obtain object recognition results for the image samples; and the parameters of the neural network are automatically adjusted according to the comparison of the obtained object recognition results with the known object recognition results for the image samples. Finally, the neural network is obtained which can offer a higher accuracy of object recognition. By applying the trained neural network, for any image, an object recognition result representing information on objects in this image can be obtained with a higher accuracy.

With the object recognition technology based on a neural network, objects of a wide variety of types can be recognized, such as license plates, characters, faces, animals, plants and the like. For example, text recognition technology based on a neural network can detect and recognize characters in an image, including characters such as license plate numbers, container serial numbers, train numbers, package tracking numbers, or barcode numbers.

The existing object recognition algorithms based on a neural network perform object recognition using a deep neural network model. However, the object recognition does not taken into account deformation of objects that may be caused by photographing or other reasons in complex scenes and that would affect the object recognition results. The deformation may include, for example, tilt, scaling and perspective transformation of an object due to the change in the angle of view during image shooting; or deformation of an object made on purpose, such as, in character recognition, tilt and distortion of characters result from font designing. For deformed images, the existing object recognition algorithms based on a neural network directly classifies objects with large deformations, which results in a low accuracy of object recognition.

An embodiment of an object recognition method for a deformed image is provided. This method proposes an end-to-end deep neural network model, which can be obtained by training with a large number of deformed image samples and known object recognition results for these image samples. The method according to the embodiment of the present application mainly includes the following steps.

At the first step, an image with its deformation corrected is obtained. Specifically, an image is input into a trained neural network in the embodiment of the present application. Convolution operations are performed, by a plurality of convolutional layers of a correction network in the neural network, on the image to obtain a feature map for the image. A regression operation is then performed on image features in the feature map of the image and outputs a plurality of localization parameters for the image. A spatial transformation is applied to the image based on the plurality of localization parameters to obtain a corrected image.

At the second step, an object classification result is obtained from the image with its deformation corrected, i.e., the corrected image. Specifically, the corrected image is input into a preset recognition network to obtain an object classification result for the image. The preset recognition network can be existing object recognition networks.

In the process of neural network based object recognition in the embodiment of the present application, the deformed image is corrected at first, and the object recognition is then performed on the corrected image. This can reduce the interference of deformation on the object recognition. The embodiment of the present application can therefore improve the accuracy of the object recognition for the deformed image.

Referring to FIG. 1, which shows a flowchart of an object recognition method for a deformed image according to an embodiment of the present application. The method includes the following steps.

Step 101, inputting an image into a preset localization network to obtain a plurality of localization parameters for the image, wherein the localization network includes a preset number of convolutional layers, and wherein the plurality of localization parameters are obtained by regressing image features in a feature map that is generated from a convolution operation on the image.

In the embodiment of the present application, the image is an image containing an object or objects and taken by any image capturing device, such as by a camera, a mobile phone, or the like. The object(s) can be of various types, such as a human, an animal, a plant, a building, a vehicle, a character, or the like.

The image in the embodiment of the present application may be an image without deformation or may be an image with deformation. An image with deformation, a deformed image, will be used as the image to illustrate embodiments of the method according to the present application by way of an example. The deformation refers to distortion of an object in the image, such as translation, scale, rotation and warping. The deformation in the embodiment of the present application may be deformation results from tilt, scaling, perspective transformation and the like of an object due to the change in the angle of view during image shooting; or may be deformation made on purpose on an object in complex natural scenes, such as tilt and warping of characters depending on font designs and changes.

An embodiment of the present application proposes an end-to-end deep neural network model. On the basis of the concept of this model, according to the embodiment of the present application, for images having different types of deformation, different networks utilized to implement the image correction and object recognition. The different networks are based on a same model concept, while their network structures and parameters for the image correction may be slightly different. The different networks for the respective deformation types are obtained from a basic network with its network structure and parameters fine-tuned. In particular, the deformation types according to the embodiment of the present application can include preset deformation types, such as deformation containing rotation, translation, or scaling, or any combination thereof and further containing multi-angle stretching deformation. An embodiment of the present application may train respective networks for the respective preset deformation types in advance.

During the object recognition of an image, an embodiment of the present application may pre-determine the deformation type of the image depending on image tasks, requirements, or scenes where the image was taken. For example, the deformation of images taken at different angles of view is mainly due to perspective deformation caused by the angles of view, which may not only include rotation, translation, or scaling, or any combination thereof, but also include multi-angle stretching deformation. For the perspective deformation caused by the angles of view, the embodiment of the present application uses a trained specific network for such deformation to implement the image correction and object recognition. The specific network has been trained with a large number of deformed image samples having deformation including rotation, translation, or scaling, or any combination thereof and further including multi-angle stretching deformation. The parameters and transformation algorithm in the network have been optimized and adjusted based on image samples having such deformation, such that the trained network can be used to correct the deformation, including rotation, translation, or scaling or any combination thereof as well as the multi-angle stretching, of a deformed image, where the deformation is perspective deformation due to angles of view. This can then lead to an object recognition result with a high accuracy for such deformation.

In the embodiment of the present application, for an image, it can be assumed that the corrected image is to be generated starting from a blank image. If the entire blank image is filled with pixels corresponding to those of the image, the corrected image can thus be obtained. Based on this concept, an embodiment of the present application set a preset number of pixels, referred to as reference points, for the corrected image that is intended to be obtained. The positions and the number of these reference points are output by a trained preset localization network through automatic analysis of features of the image. The selected reference points can be used to obtain parameters needed for correcting the deformation so as to correct the deformed image. These reference points are set under the principle that they can represent shape information of the corrected image as much as possible, so that the shape profile of the corrected image can be obtained using the preset number of reference points.

For example, the preset number of reference points can be a plurality of pixels evenly distributed on the edges of the corrected image. Specifically, for the image-based character recognition, it is desired that the corrected image (i.e., an image to be input to a recognition network) is of a regular shape, such as a rectangle, so as to reduce the computation and complexity of the recognition network. Further, it is desired that characters in the corrected image cover the whole rectangle, so that pixels of the corrected image have maximum available information. In view of this, the preset number of reference points in the embodiment of the present application is set as the preset number of pixels evenly distributed on the edges of the rectangle, so that they reflect the shape information of the corrected image.

In the embodiment of the present application, for a type of deformation, a corresponding preset localization network is used. The positions and the number of reference points for the image with this type of deformation are directly output from the corresponding preset localization network that has been trained. Preset localization networks for different deformation types may output different positions of and the number of reference points for the corrected image. For example, in case of an image with only translation deformation, any pixel of the image can be selected as the reference point; while in case of an image with other more complex deformation, such as perspective deformation, at least pixels at the four corners on the boundary of the image are required as the reference points. It can be appreciated that the more complex the deformation is, the more the reference points are needed, and the more stringent requirement on the positions of the reference points will be.

The preset localization network in the embodiment of the present application is a preset neural network, which includes a plurality of convolutional layers and at least one fully-connected layer. Each of the convolutional layers contains a plurality of convolution kernels with weights, and the fully-connected layer contains a weight matrix.

The convolution kernel can extract different image features, such as image edges, acute angles, from an image, to obtain a feature map of the image, which contains these image features. The weight matrix in the fully-connected layer contains a plurality of weights representing linear relationships between input data and corresponding classification results.

After the fully-connected layer in the preset localization network according to the embodiment of the present application has been trained, the weights in the weight matrix can represent the linear relationship between the feature map of the image and the positions of the preset number of reference points in the image. Step 101 mainly includes: extracting different image features from the image by using the plurality of convolutional layers of the embodiment of the present application; and then searching the extracted image features for image features matching with the image features of the preset number of reference points by using the fully-connected layer, that is, performing a regression operation based on the image features of the reference points. The positions of pixels having the image features matching with the image features of the reference points are taken as the localization parameters. That means, through step 101, the embodiment of the present application can obtain the positions of the preset number of reference points in the corrected image and the corresponding positions of the preset number of reference points in the image.

Step 102, performing a spatial transformation on the image based on the plurality of localization parameters to obtain a corrected image.

In an embodiment of the present application, a spatial transformation relationship for all the reference points from the image to the corrected image is obtained based on the positions of the reference points in the image and the positions of the reference points in the corrected image. The spatial transformation relationship is applicable to all the pixels of the image, and is used to determine respective positions, in the corrected image, of all the pixels of the image, so as to obtain the corrected image.

In the embodiment of the present application, the transformation algorithm utilized in the spatial transformation can vary depending on the deformation types. For example, an affine transformation algorithm may be used for deformation including rotation, translation, or scaling, or any combination thereof. A perspective transformation algorithm may be used for deformation that includes multi-angle stretching deformation in addition to the deformation of rotation, translation, or scaling or any combination thereof. A thin plate spline transformation algorithm may be used for spatial distortion in the perspective deformation. The above exemplified three transformation algorithms use different reference points. The complexities of the deformation to which these transformation algorithms can be applied increase successively, and the complexities of corresponding spatial transformation relationships also increase successively. For example, the spatial transformation relationship in the affine transformation algorithm may be a coordinate transformation matrix containing the relationship of the change in the coordinates of the reference points. For another example, the thin plate spline transformation algorithm contains multiple complex transformations including a plurality of transformation parameters or formulas.

The different transformation algorithms all use the localization parameters as basic data to obtain the transformation parameters for spatial transformation which they required. Specifically, an embodiment of the present application determines transformation parameters for a transformation algorithm, based on the positions of the reference points in the corrected image (i.e., the preset positions of the reference points) and the localization parameters (i.e., the positions of the reference points in the image). This transformation algorithm together with the determined transformation parameters are then used to calculate position information of pixels in the corrected image from the pixels of the image. After position information of all the pixels in the corrected image are obtained, the corrected image is thus obtained.

Step 103, inputting the corrected image into a preset recognition network to obtain an object classification result for the image.

The preset recognition network includes one or more neural networks that have been trained. The preset recognition network uses the convolutional layers to extract image features from the corrected image, to obtain a feature map for the corrected image. The preset recognition network then uses the fully-connected layer to classify the image features contained in this feature map, and outputs an object classification result.

The preset recognition network in the embodiment of the present application may be existing object recognition networks. The preset recognition network can be a recognition network varying depending on the types of objects, such as a network for character recognition, or a network for face recognition, etc.

An embodiment of the present application may use an alternative existing object recognition network or combine existing object recognition networks for recognizing various types of objects.

It can be seen that, in the object recognition method for a deformed image provided by the embodiment of the present application, an image is first input into a preset localization network to obtain a plurality of localization parameters for the image. The localization network includes a preset number of convolutional layers, which are obtained by regressing image features in a feature map that is generated by a convolution operation on the image. Then, a spatial transformation is performed on the image based on the plurality of localization parameters to obtain a corrected image. Finally, the corrected image is input into a preset recognition network to obtain an object classification result for the image. In the process of the neural network based object recognition, the embodiment of the present application first corrects the deformation of the deformed image, and then performs the object recognition on the corrected image. This can reduce the interference of the deformation on the object recognition, and therefore improve the accuracy of the object recognition for a deformed image.

Figure 2:
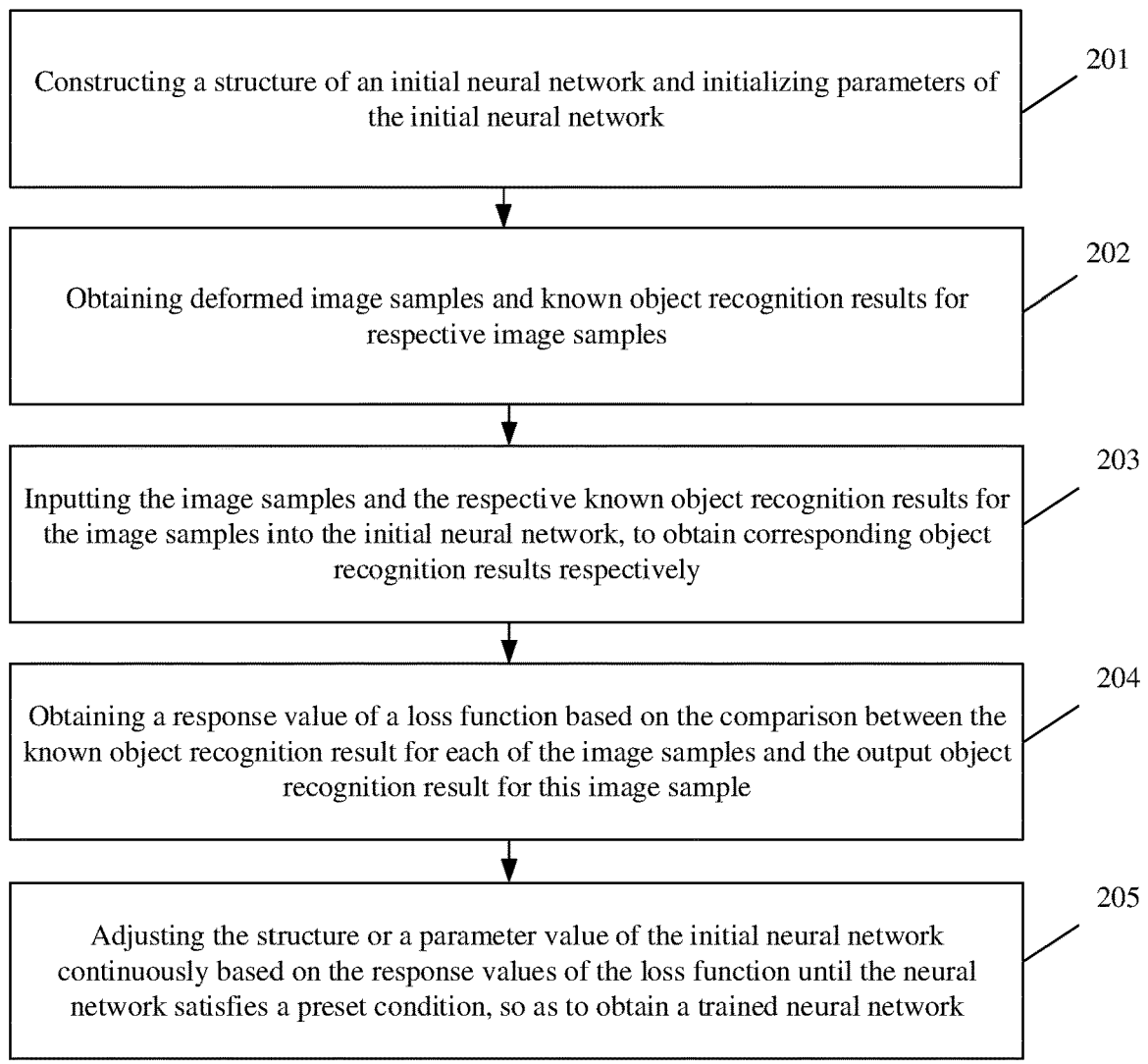
FIG. 2 is a flowchart of the training of a neural network according to an embodiment of the present application.

An embodiment of the present application can construct and train a neural network using the method shown in FIG. 1, which is then used to implement the method according to an embodiment of the present application. Referring to FIG. 2, which shows a flowchart of the training of the neural network according to the embodiment of the present application. The training includes the following steps.

Step 201, constructing a structure of an initial neural network and initializing parameters of the initial neural network.

At present, the neural network has been widely adopted in image recognition and other fields. Many neural network structures have been known from the prior art. The embodiment of the present application can construct the initial neural network in combination with an existing neural network structure. The neural network according to the embodiment of the present application can be split into a correction network and a recognition network with respect to functionalities. The correction network includes a localization network and a spatial transformation network. The correction network and the recognition network respectively include at least one convolutional layer and at least one fully-connected layer. The parameters include, the number of convolution kernels for the convolutional layer, sizes of the convolution kernels, weights for the convolution kernels, and a weight matrix for the fully-connected layer, etc.

While constructing the initial neural network, the embodiment of the present application sets values for the parameters of the initial neural network, including the number of the convolution kernels for the convolutional layer, such as 32 or 64; the sizes of the convolution kernels, such as 3*3 or 5*5; the weights for the convolution kernels; and the weight matrix for the fully-connected layer. In the embodiment of the present application, each matrix of the initial neural network can be initialized with any known value. Alternatively, each matrix of the initial neural network can be initialized randomly with real number using a method such as the msra algorithm.

So far, the construction of the initial neural network in the embodiment of the present application has been completed. The embodiment of the present application may adjust the structure and the parameters of the correction network in connection with the preset deformation types, to obtain a plurality of initial neural networks specific to respective preset deformation types.

Step 202, obtaining deformed image samples and known object recognition results for respective image samples.

The embodiment of the present application obtains a large number of deformed image samples containing a deformed object(s) and respective known object recognition results for the image samples. A deformed image is an image containing an object that is deformed with for example translation, scaling, rotation, warping, or the like. The objects in the embodiment of the present application may include people, animals, plants, buildings, vehicles, characters. The image samples can be any images taken by an image capturing device, such as images taken by a camera or taken by a mobile phone. The image samples can be images acquired in real-time acquired or images that have been stored.

In the embodiment of the present application, a plurality of deformation types are preset. The image samples containing an object with a preset deformation type are obtained, and image samples having an object with a preset deformation type are used to train a neural network specific to this preset deformation type.

Step 203, inputting the image samples and the respective known object recognition results for the image samples into the initial neural network, to obtain corresponding object recognition results respectively.

In the embodiment of the present application, the image samples corresponding to a preset deformation type and the known object recognition results for the image samples are input into an initial neural network specific to this preset deformation type, which then outputs corresponding object recognition results for the image samples.

Step 204, obtaining a response value of a loss function based on the comparison between the known object recognition result for each of the image samples and the output object recognition result for this image sample.

One or more loss functions can be preset in the embodiment of the present application. Each loss function measures, from a certain perspective, the difference between a known object recognition result and a corresponding object recognition result for an image sample output by the initial neural network. For example, the loss function may be a reduction function for the known object recognition result and the corresponding object recognition result output by the initial neural network, or may be a function to calculate the Euclidean distance between them. In the embodiment of the present application, the response values from a plurality of loss functions can be weighted to obtain a result for the difference between the known object recognition result and the correspondingly output object recognition result measured from multiple perspectives. In this way, the degree of the difference between the known object recognition result and the correspondingly output object recognition result can be measured more accurately.

Step 205, adjusting the structure or a parameter value of the initial neural network continuously based on the response values of the loss function until the neural network satisfies a preset condition, so as to obtain a trained neural network.

The embodiment of the present application aims to train a neural network so that the loss function reaches a minimum value. Thus, in the embodiment of the present application, a target value is set for the response value of the loss function. The structure or a parameter value of the initial neural network is continuously adjusted until the neural network satisfies the preset condition that the response value of the loss function reaches the object value, and then the trained neural network is obtained.

In the actual training process, generally the response value of the loss function can be checked randomly and compared several times. When the reduction of the response value of the loss function reaches a preset value, an object recognition result for an image sample output from the neural network is checked by comparing this result with the known object recognition result for this image sample, to obtain the recognition accuracy. When the recognition accuracy reaches a preset accuracy, such as an accuracy of 98%, the training is stopped and the trained neural network is thereby obtained. This process is performed is an accuracy-led process which is implemented in association with the recognition accuracy of the object recognition results and avoids the needs to set the response value of the loss function, and thus can better fit the use purpose and actual conditions.

The adjustment of the structure of the initial neural network may include changing the type and the number of the layers in the network, or adding or removing other components, and the like. The adjustment of a parameter(s) of the initial neural network may include changing the number of the convolution kernels, the sizes of the convolution kernels, the weights of the convolution kernels in the convolutional layer, and the weight matrix of the fully-connected layer, and the like. The parameter value of the initial neural network can be adjusted using a gradient descent method.

Figure 3:
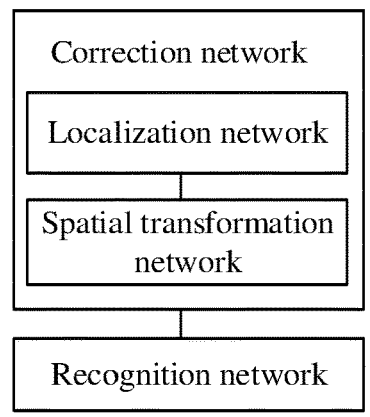
FIG. 3 is a diagram illustrating the structure of a neural network according to an embodiment of the present application.

At steps 201 to 205, the establishment and training of the neural network in the embodiment of the present application are completed. The trained neural network can automatically extract image features from any image containing an object(s), and output an object recognition result for the object in the image. Specifically, for the plurality of preset deformation types, the embodiment of the present application trains a specific neural network specific to each of the deformation types respectively. In the subsequent object recognition, for an image with a preset deformation type, a corresponding neural network specific to this preset deformation type is used for calculation, to obtain a recognition result with a higher accuracy. Referring to FIG. 3, which shows a diagram of the structure of a neural network according to an embodiment of the present application. The neural network as shown includes a correction network and a recognition network. The correction network includes a localization network and a spatial transformation network.

Figure 4:
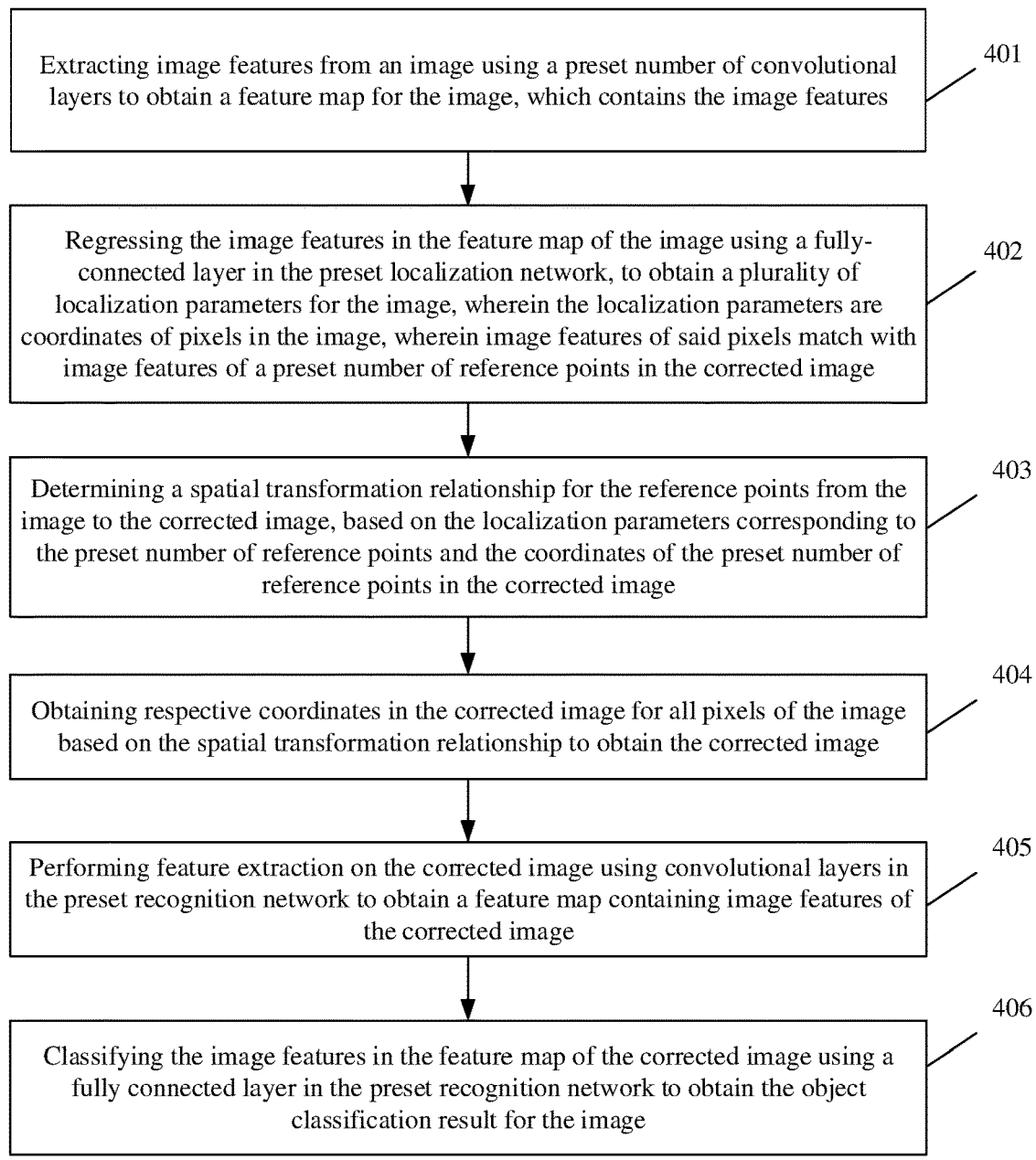
FIG. 4 is another flowchart of an object recognition method for a deformed image according to an embodiment of the present application.

On the basis of the FIGS. 1, 2 and 3, another flowchart of an object recognition method for a deformed image according to an embodiment of the present application is provided as a preferred embodiment, as shown in FIG. 4. The method includes the following steps.

Step 401, extracting image features from an image using a preset number of convolutional layers to obtain a feature map for the image, which contains the image features.

It has been known that an image usually has three channels, i.e., the red, green and blue channels. Channel is a term used to refer to a certain component of an image. The image data for each color is a two-dimensional matrix, and the elements in the matrix are the values of pixels ranging from 0 to 255. The combination of the two-dimensional matrices of the three channels is a matrix for the pixels of the original image, i.e., data of the original image.

In an embodiment of the present application, the image is input into a trained neural network, and a convolution operation is performed on the matrix for the pixels of the image using a plurality of convolution kernels in the preset number of convolutional layers of a localization network. The convolution kernels can be understood as learnable filters, and the width and height of each filter in space are smaller than those of the matrix for the pixels of the image, while the depth of the filter is identical to that of the matrix for the pixels of the image. A convolution kernel can be regarded as a matrix with weights, which are used by the convolution kernel to extract image features.

For example, the size of a typical convolution kernel of the first convolutional layer may be 5×5×3, i.e., a matrix with weights, which has a width of 5, a height of 5, and a depth of 3. The depth is 3 because the input image, namely the image, has three color channels, i.e., red, green and blue channels. In the convolution operation, each convolution kernel, i.e., the filter, is moving along the width and the height of the input data, i.e., the matrix for the pixels of the image. A moving stride has to be preset for the movement of the filter. When the stride is set to 1, the filter moves by 1 pixel each time. Then, the inner product of the whole filter and any point in the input data is calculated, i.e., the inner product of the weight of the filter and the value of a pixel at a corresponding position.

When the movement of the filter along the width and height of the input data is completed, a two-dimensional activation map is generated, which is a feature map of the image as noted above. The activation map gives a response of the filter at each spatial position, i.e., the image features extracted by the filter. Generally speaking, the convolution neural network will make the filter to learn to be activated when it encounters certain types of image features. A certain visual image feature may be the boundary in a direction or spot of a certain color, and the like. The filters look for different image features in the input data, and then concatenate the different image features to obtain the feature map of the image.

In the embodiment of the present application, after the convolutional layers, a pooling layer can also be added to downsample the feature map output from the convolutional layers. The main process of the pooling layer is to divide the feature map into a plurality of preset regions, and downsample the pixel values within each preset region to one pixel value, so as to reduce the amount of data and obtain a downsampled feature map.

For example, if the input of a first convolutional layer is an original image, different neurons along the depth dimension may be activated by boundaries in different directions or by color spots. A collection of these neurons, whose receiving regions are identical and which are arranged along the depth direction, are called a depth column or depth slice. The function of the pooling layer is to reduce the spatial size of the data volume, to reduce the amount of parameters and computation in the network, and hence to also control overfitting.

The pooling layer can operate independently on every depth slice of the input data volume resize it spatially, using the MAX operation. The most common form is that a pooling layer with filters of size 2×2 applied with a stride of 2 downsamples every depth slice by 2. For example, if the output of the convolutional layer is a data volume of 32*32*12, the pooling layer divides 32*32 into 16*16 data regions of 2*2, and then takes a max over four numbers in each data region of 2*2, and finally obtains a downsampled data volume of 16*16*12. Compared with the original data volume of 32*32*12, the width and height of the obtained data volume are reduced, but the depth remains unchanged. The max pooling discards 75% of the activations in the original data volume. Of course, the pooling layer can also perform other pooling functions, such as average pooling.

Step 402, regressing the image features in the feature map of the image using a fully-connected layer in the preset localization network, to obtain a plurality of localization parameters for the image. The localization parameters are coordinates of pixels in the image, wherein image features of said pixels match with image features of a preset number of reference points in the corrected image.

In the embodiment of the present application, the preset number of reference points are obtained through a preset localization network in a neural network trained in advance for a preset deformation type. That is, the coordinates of the preset number of pixels are obtained, which can be understood as the coordinates in the blank image for constructing the corrected image. The positions and the number of the reference points are the positions and the number of pixels that can provide the parameters required for correcting this deformation type for the deformed image. For example, for an image that is deformed with rotation, at least one reference point may be selected to determine the rotation angle as the parameter for the deformation correction to obtain the corrected image. For an image that is deformed with perspective transformation, the points at the four corners on the boundary of the image, as the reference points, are at least required to determine the parameters for the deformation correction to obtain the corrected image. For an image that has complex deformation such as spatial distortion, it is necessary to select 20 or more pixels in the image as the reference points to determine the parameters for the deformation correction to obtain the corrected image.

Therefore, the reference points in the embodiment of the present application are based on the deformation types. The principle of setting the reference points is that the positions and the number of the reference points are set in a way that they can offer a desired correction of the whole image.

In the embodiment of the present application, image features of the image are classified to identify image features matching with image features of the preset reference points in the corrected image. That is to say, for a preset reference point, a pixel in the image is identified which has an image feature identical to the image feature of this preset reference point. The coordinates of the identified pixel are taken as localization parameters for the reference point.

Specifically, in the embodiment of the present application, the fully-connected layer in the preset localization network is trained such that the weights in the weight matrix represent the linear relationship between the feature map of the image and the positions of the preset number of reference points in the image. The weight matrix of the trained fully-connected layer is multiplied with a pixel matrix corresponding to the feature map of the image, to obtain the preset number of localization parameters. The localization parameters are the coordinates, in the image, of the preset number of reference points for the corrected image. For example, 20 reference points are selected. At step 402, the coordinates of the 20 reference points are determined as the localization parameters, which are 40 coordinate values including x-coordinates and y-coordinates.

Step 403, determining a spatial transformation relationship for the reference points from the image to the corrected image, based on the localization parameters corresponding to the preset number of reference points and the coordinates of the preset number of reference points in the corrected image.

In the embodiment of the present application, the spatial transformation relationship for the reference points from the image to the corrected image is obtained based on the localization parameters for the preset number of reference points (i.e., the coordinates of the reference points in the image) and the coordinates of the preset number of reference points in the corrected image. In the embodiment of the present application, the spatial transformation relationship for the reference points from the image to the corrected image is used to calculate a general spatial transformation relationship. The general spatial transformation relationship that is obtained based on the preset number of reference points is then used to transform the coordinates of all the pixels in the image, so as to obtain respective coordinates in the corrected image for all these pixels. The entire corrected image is thus filled with pixels.

The spatial transformation relationship in the embodiment of the present application depends on the deformation types. For example, for simple transformation such as translation, only displacements of the coordinates are needed as the parameter required for the deformation correction to implement the spatial transformation. For scaling deformation without any translation or rotation, only the scaling factor is needed as the parameter required for the deformation correction to implement the spatial transformation. For complex deformation, e.g., deformation including translation, rotation, scaling and warping, the entire spatial transformation cannot be done with coordinates of certain pixels or parameters needed for one or two deformation types alone. It is necessary to select more reference points so as to obtain more parameters for the complex deformation to calculate the entire spatial transformation relationship.

The spatial transformation relationship may involve various operations, parameters, formulas or mathematical calculation forms depending on the complexity of deformation types. For example, the simplest spatial transformation can be a coordinate transformation matrix for the coordinates of the reference points from the image to the corrected image. The coordinate transformation matrix is obtained from the localization parameters for the preset number of reference points (i.e., the coordinates of the preset number of reference points in the image) and the coordinates of the preset number of reference points in the corrected image. This coordinate transformation matrix can be applied to all the pixels of the image, and represents the transformation between coordinates of pixels of the image and the coordinates of pixels of the corrected image.

It should be noted that the coordinate transformation matrix is only an example of the spatial transformation relationship. Generally speaking, localization parameters are necessary information for a spatial transformation. For a deformation type, once the localization parameters are obtained, the specific transformation parameters required in the transformation algorithm to correct this deformation type can be obtained. The specific transformation parameters may involve various specific operations, parameters, and calculation methods, with which the corresponding transformation algorithm can correct the deformation type Therefore, step 403 may be further specifically summarized as:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image. The preset transformation algorithm includes one of an affine transformation algorithm, a perspective transformation algorithm and a thin plate spline transformation algorithm.

Step 404, obtaining respective coordinates in the corrected image for all pixels of the image based on the spatial transformation relationship to obtain the corrected image.

In the embodiment of the present application, for deformation with different complexities, the spatial transformation relationship may involve different operations, parameters and calculation methods. In the embodiment of the present application, with a spatial transformation relationship for correcting deformation of a preset deformation type, a corresponding transformation algorithm is used to obtain respective coordinates, in the corrected image, of all pixels of the image using different operations, parameters and calculation methods, so as to obtain the corrected image.

The three transformation algorithms previously mentioned (i.e., the affine transformation algorithm, the perspective transformation algorithm and the thin plate spline transformation algorithm) are specific transformation algorithms for deformation with different complexities. In the embodiment of the present application, each specific network for a deformation type selects a transformation algorithm based on the deformation type. These three transformation algorithms are used separately for corresponding deformation types. For example, for a perspective deformation caused by angle of view, the embodiment of the present application only adopts the perspective transformation algorithm. Instead, the affine transformation algorithm will not be used to correct the perspective deformation caused by the angle of view, since it is unable to solve perspective problem. In addition, the thin plate spline algorithm can also perform the perspective transformation, and of course can be used in the network in place of the perspective transformation algorithm. However, in addition to perspective problem, the thin plate spline algorithm can solve various other deformation problems, such as warping, bending and the like. The more powerful the algorithm is, the more computations and time are required. Thus, for a perspective problem alone, the perspective transformation algorithm is generally adopted, rather than the thin plate spline algorithm.

Taking the above coordinate transformation matrix as an example, in the embodiment of the present application, the affine transformation algorithm can be used to multiply the coordinate matrix for pixels of the image by the coordinate transformation matrix, to produce the coordinate matrix of pixels for the corrected image. The coordinates, in the corrected image, of all the pixels of the image are obtained based on the produced coordinate matrix, and finally the corrected image is obtained.

Therefore, step 404 can be further specifically summarized as: calculating, from coordinates of all the pixels of the image, the respective coordinates in the corrected image for all the pixels, by using the preset transformation algorithm with the transformation parameters to obtain the corrected image.

Step 405, performing feature extraction on the corrected image using convolutional layers in the preset recognition network to obtain a feature map containing image features of the corrected image.

The preset recognition network in the embodiment of the present application is a trained neural network, which can be any existing object recognition networks for a type of objects. For example, in character recognition, the preset recognition network can be composed of a convolution neural network (CNN) and a recurrent neural network (RNN).

In the embodiment of the present application, every pixel of the corrected image is convoluted with a convolution kernel of a convolutional layer in a preset recognition network to obtain a feature map, and the convolution kernel extracts the image features of the corrected image to obtain a feature map for the corrected image.

Step 406, classifying the image features in the feature map of the corrected image using a fully connected layer in the preset recognition network to obtain the object classification result for the image.

In the embodiment of the present application, the pixel matrix for the feature map of the corrected image is multiplied with the weight matrix of the fully-connected layer in the preset recognition network to obtain an object classification result for the feature map of the corrected image.

For example, in character recognition, firstly, the CNN and RNN are used to extract image features of the corrected image to generate a feature map. The feature map is then classified by a fully-connected layer to obtain a feature sequence that is still data information of values of pixels. Then, a sequence decoder configured with preset correspondences between character sequences and strings is used to convert the feature sequence to characters to obtain a recognized string. For example, an image containing a string "hello" is processed through convolutional layers and a fully-connected layer, and a 1*60 feature sequence is obtained. The feature sequence contains data information of image features, such as the digit 0, and 1. The feature sequence is input into the sequence decoder, which outputs 8, 5, 12, 12, and 15. The sequence decoder can then obtain the string "hello" based on the preset correspondences between feature sequences and strings.

As can be seen, in the object recognition method for a deformed image provided by the embodiments of the present application, first, an image is input into a preset localization network. A preset number of convolutional layers is used to extract image features from the image to generate a feature map for the image. A fully-connected layer in a preset localization network is used to regress the image features in the feature map to obtain a plurality of localization parameters for the image. The localization parameters are coordinates of pixels in the image, wherein image features of said pixels match with image features of a preset number of reference points in the corrected image. Then, a spatial transformation relationship for the reference points from the image to the corrected image is determined based on the localization parameters corresponding to the preset number of reference points and coordinates of the preset number of reference points in the corrected image. Respective coordinates in the corrected image for all pixels of the image are obtained based on the spatial transformation relationship to obtain the corrected image. Finally, feature extraction is performed on the corrected image using convolutional layers in the preset recognition network to generate a feature map containing image features of the corrected image. The image features in the feature map of the corrected image is classified using a fully connected layer in the preset recognition network to obtain the object classification result for the image. In the process of the neural network based object recognition, the embodiment of the present application first corrects the deformation of the deformed image, and then performs the object recognition on the corrected image. This can reduce the interference of the deformation on the object recognition, and therefore improve the accuracy of the object recognition for a deformed image.

Figure 5:
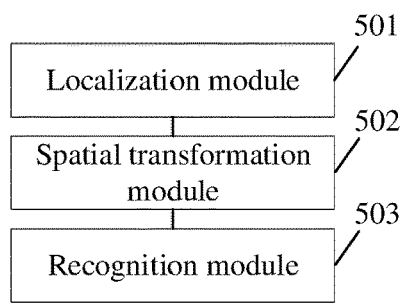
FIG. 5 is a diagram illustrating the structure of an object recognition apparatus for a deformed image according to an embodiment of the present application.

Referring to FIG. 5, which shows a diagram illustrating the structure of an object recognition apparatus for a deformed image according to an embodiment of the present application. The apparatus includes:

a localization module 501, configured for inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image;

a spatial transformation module 502, configured for performing a spatial transformation on the image based on the plurality of localization parameters to obtain a corrected image; and a recognition module 503, configured for inputting the corrected image into a preset recognition network to obtain an object classification result for the image.

It can be seen, in the object recognition apparatus for a deformed image provided by the embodiment of the present application, an image is first input into a preset localization network to obtain a plurality of localization parameters for the image. The localization network includes a preset number of convolutional layers, which are obtained by regressing image features in a feature map that is generated by a convolution operation on the image. Then, a spatial transformation is performed on the image based on the plurality of localization parameters to obtain a corrected image. Finally, the corrected image is input into a preset recognition network to obtain an object classification result for the image. In the process of the neural network based object recognition, the embodiment of the present application first corrects the deformation of the deformed image, and then performs the object recognition on the corrected image. This can reduce the interference of the deformation on the object recognition, and therefore improve the accuracy of the object recognition for a deformed image.

It should be noted that the apparatus in the embodiment of the present application is an apparatus to perform the object recognition method for a deformed image described above, and thus all the embodiments of the method are applicable to the apparatus. The embodiments of the apparatus can achieve the same or similar beneficial effects.

Figure 6:
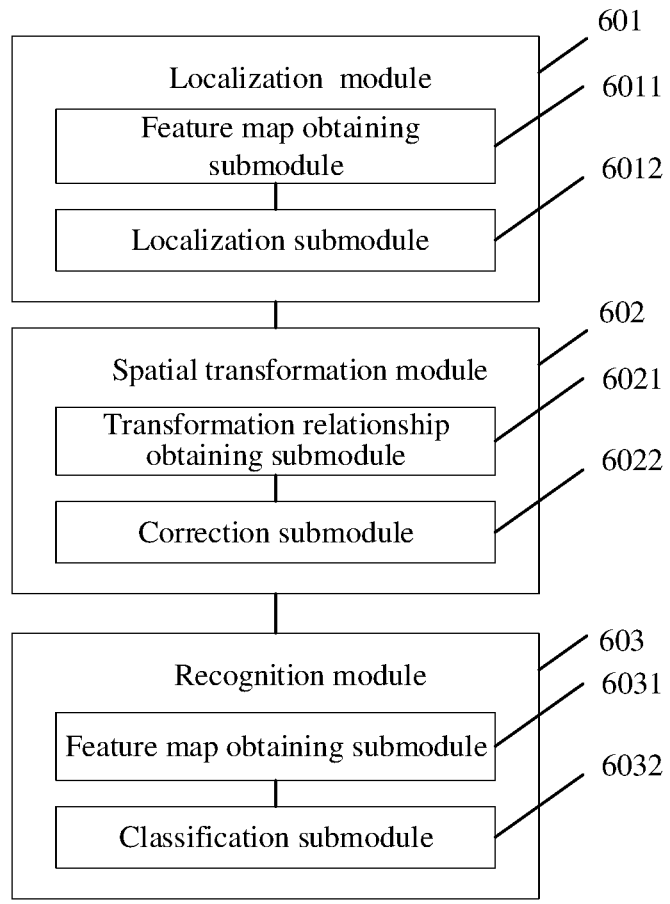
FIG. 6 is a diagram illustrating another structure of an object recognition apparatus for a deformed image according to an embodiment of the present application.

On the basis of FIG. 5, a diagram of another structure of the object recognition apparatus for a deformed image according to an embodiment of the present application is provided as a preferred embodiment, as shown in FIG. 6.

In an embodiment of the present application, the localization module 601 includes:

an feature map obtaining submodule 6011, configured for performing a feature extraction on the image using the preset number convolutional layers to generate the feature map containing the image features of the image; and a localization submodule 6012, configured for regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

In an embodiment of the present application, the spatial transformation module 602 includes:

a transformation relationship obtaining submodule 6021, configured for determining a spatial transformation relationship for the reference points from the image to the corrected image, based on the localization parameters corresponding to the preset number of reference points and coordinates of the preset number of reference points in the corrected image; and a correction submodule 6022, configured for obtaining respective coordinates in the corrected image for all pixels of the image based on the spatial transformation relationship to obtain the corrected image.

In an embodiment of the present application, the transformation relationship obtaining submodule 6021 is specifically configured for:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm includes one of an affine transformation algorithm, a perspective transformation algorithm or a thin plate spline transformation algorithm.

The correction submodule 6022 is specifically configured for:

calculating, from coordinates of all the pixels of the image, the respective coordinates in the corrected image for all the pixels, by using the preset transformation algorithm with the transformation parameters to obtain the corrected image.

In an embodiment of the present application, the recognition module 603 includes:

a feature map obtaining submodule 6031, configured for performing feature extraction on the corrected image using convolutional layers in the preset recognition network to generate a feature map containing image features of the corrected image; and a classification submodule 6032, configured for classifying the image features in the feature map of the corrected image using a fully connected layer in the preset recognition network to obtain the object classification result for the image.

As can be seen, in the object recognition apparatus for a deformed image provided by the embodiments of the present application, first, an image is input into a preset localization network. A preset number of convolutional layers is used to extract image features from the image to generate a feature map for the image. A fully-connected layer in a preset localization network is used to regress the image features in the feature map to obtain a plurality of localization parameters for the image. The localization parameters are coordinates of pixels in the image, wherein image features of said pixels match with image features of a preset number of reference points in the corrected image. Then, a spatial transformation relationship for the reference points from the image to the corrected image is determined based on the localization parameters corresponding to the preset number of reference points and coordinates of the preset number of reference points in the corrected image. Respective coordinates in the corrected image for all pixels of the image are obtained based on the spatial transformation relationship to obtain the corrected image. Finally, feature extraction is performed on the corrected image using convolutional layers in the preset recognition network to generate a feature map containing image features of the corrected image. The image features in the feature map of the corrected image is classified using a fully connected layer in the preset recognition network to obtain the object classification result for the image. In the process of the neural network based object recognition, the embodiment of the present application first corrects the deformation of the deformed image, and then performs the object recognition on the corrected image. This can reduce the interference of the deformation on the object recognition, and therefore improve the accuracy of the object recognition for a deformed image.

Figure 7:
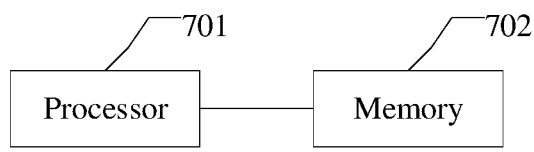
FIG. 7 is a diagram illustrating the structure of an electronic device provided by an embodiment of the present application.

An embodiment of the present application further discloses an electronic device, as shown in FIG. 7, which includes a processor 701 and a memory 702.

The memory 702 is configured for storing a computer program.

The processor 701 is configured to execute the computer program stored in the memory 702 to carry out an object recognition method for a deformed image. The method includes: inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image;

performing a spatial transformation on the image based on the plurality of localization parameters to obtain a corrected image; and inputting the corrected image into a preset recognition network to obtain an object classification result for the image.

In the embodiment of the present application, the electronic device first inputs an image into a preset localization network to obtain a plurality of localization parameters for the image. The preset localization network includes a preset number of convolutional layers. The plurality of localization parameters are obtained by regressing image features in a feature map that is generated from a convolution operation on the image. The electronic device then performs a spatial transformation on the image based on the plurality of localization parameters to obtain a corrected image. Finally, the electronic device inputs the corrected image into a preset recognition network to obtain an object classification result for the image. In the process of the neural network based object recognition, the embodiment of the present application first corrects the deformation of the deformed image, and then performs the object recognition on the corrected image. This can reduce the interference of the deformation on the object recognition, and therefore improve the accuracy of the object recognition for a deformed image.

In an implementation of an embodiment of the present application, inputting the image into the preset localization network to obtain the plurality of localization parameters for the image, includes:

performing a feature extraction on the image using the preset number convolutional layers to generate the feature map containing the image features of the image; and regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

In an implementation of an embodiment of the present application, performing the spatial transformation on the image based on the plurality of localization parameters to obtain the corrected image, includes:

determining a spatial transformation relationship for the reference points from the image to the corrected image, based on the localization parameters corresponding to the preset number of reference points and coordinates of the preset number of reference points in the corrected image; and obtaining respective coordinates in the corrected image for all pixels of the image based on the spatial transformation relationship to obtain the corrected image.

In an implementation of an embodiment of the present application, determining the spatial transformation relationship for the reference points from the image to the corrected image, based on the localization parameters corresponding to the preset number of reference points and the coordinates of the preset number of reference points in the corrected image, includes:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm includes one of an affine transformation algorithm, a perspective transformation algorithm or a thin plate spline transformation algorithm; and wherein obtaining the respective coordinates in the corrected image for all pixels of the image based on the spatial transformation relationship to obtain the corrected image, includes:

calculating, from coordinates of all the pixels of the image, the respective coordinates in the corrected image for all the pixels, by using the preset transformation algorithm with the transformation parameters to obtain the corrected image.

In an implementation of an embodiment of the present application, inputting the corrected image into the preset recognition network to obtain the object classification result for the image, includes:

performing feature extraction on the corrected image using convolutional layers in the preset recognition network to generate a feature map containing image features of the corrected image; and classifying the image features in the feature map of the corrected image using a fully connected layer in the preset recognition network to obtain the object classification result for the image.

An embodiment of the present application further discloses a computer readable storage medium having a computer program stored thereon which, when executed by a processor, causes the processor to carry out an object recognition method for a deformed image. The method includes:

inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image;

performing a spatial transformation on the image based on the plurality of localization parameters to obtain a corrected image; and inputting the corrected image into a preset recognition network to obtain an object classification result for the image.

In the embodiment of the present application, the computer program, when executed by a processor, cause the processor to perform operations including: firstly inputting an image into a preset localization network to obtain a plurality of localization parameters for the image, wherein the preset localization network includes a preset number of convolutional layers, and wherein the plurality of localization parameters are obtained by regressing image features in a feature map that is generated from a convolution operation on the image; secondly, performing a spatial transformation on the image based on the plurality of localization parameters to obtain a corrected image; and finally, inputting the corrected image into a preset recognition network to obtain an object classification result for the image. In the process of the neural network based object recognition, the embodiment of the present application first corrects the deformation of the deformed image, and then performs the object recognition on the corrected image. This can reduce the interference of the deformation on the object recognition, and therefore improve the accuracy of the object recognition for a deformed image.

In an implementation of an embodiment of the present application, inputting the image into the preset localization network to obtain the plurality of localization parameters for the image, includes:

performing a feature extraction on the image using the preset number convolutional layers to generate the feature map containing the image features of the image; and regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

In an implementation of an embodiment of the present application, performing the spatial transformation on the image based on the plurality of localization parameters to obtain the corrected image, includes:

determining a spatial transformation relationship for the reference points from the image to the corrected image, based on the localization parameters corresponding to the preset number of reference points and coordinates of the preset number of reference points in the corrected image; and obtaining respective coordinates in the corrected image for all pixels of the image based on the spatial transformation relationship to obtain the corrected image.

In an implementation of an embodiment of the present application, determining the spatial transformation relationship for the reference points from the image to the corrected image, based on the localization parameters corresponding to the preset number of reference points and the coordinates of the preset number of reference points in the corrected image, includes:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm includes one of an affine transformation algorithm, a perspective transformation algorithm or a thin plate spline transformation algorithm; and wherein obtaining the respective coordinates in the corrected image for all pixels of the image based on the spatial transformation relationship to obtain the corrected image, includes:

calculating, from coordinates of all the pixels of the image, the respective coordinates in the corrected image for all the pixels, by using the preset transformation algorithm with the transformation parameters to obtain the corrected image.

In an implementation of an embodiment of the present application, inputting the corrected image into the preset recognition network to obtain the object classification result for the image, includes:

performing feature extraction on the corrected image using convolutional layers in the preset recognition network to generate a feature map containing image features of the corrected image; and classifying the image features in the feature map of the corrected image using a fully connected layer in the preset recognition network to obtain the object classification result for the image.

It should be noted that the relationship terms herein such as "first", "second" and the like are only used to distinguish one entity or operation from another entity or operation, but do not necessarily require or imply that there is an actual relationship or order between these entities or operations. Moreover, the terms "include", "comprise" or any variants thereof are intended to cover a non-exclusive inclusion, such that processes, methods, articles or devices including a set of elements include not only those elements listed, but also other elements not specifically listed or the elements intrinsic to these processes, methods, articles, or devices. Without further limitations, elements limited by the wording "include(s) a/an . . ." do not exclude that there are additional identical elements in the processes, methods, articles, or devices that include the listed elements.

All embodiments in the detailed description are described in a correlated manner, and description of identical or similar parts in an embodiment can apply to one another containing the same. The description for each embodiment focuses on the differences from other embodiments. In particular, a brief description is provided to the embodiments of the apparatus and electronic device in view of their resemblance with those of the method. Relevant details can be known with reference to the description of the method examples.

The embodiments described above are just preferable embodiments of the present application, and are not indented to limit scope of the present application. Any modifications, alternatives, improvements or the like within the spirit and principle of the present application shall be included in the protection scope of the present application.

The invention claimed is:

1. An object recognition method for a deformed image, comprising:
   inputting an image into a preset localization network to obtain a plurality of localization parameters for the image, wherein the preset localization network comprises a preset number of convolutional layers, and wherein the plurality of localization parameters are obtained by regressing image features in a feature map that is generated from a convolution operation on the image;
   performing a spatial transformation on the image based on the plurality of localization parameters to obtain a corrected image; and
   inputting the corrected image into a preset recognition network to obtain an object classification result for the image,
   wherein the preset localization network and the preset recognition network correspond to a deformation type of the image, and
   wherein inputting the image into the preset localization network to obtain the plurality of localization parameters for the image, comprises:
   performing a feature extraction on the image using the preset number convolutional layers to generate the feature map containing the image features of the image; and
   regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

2. The method according to claim 1, wherein performing the spatial transformation on the image based on the plurality of localization parameters to obtain the corrected image, comprises:
   determining a spatial transformation relationship for the reference points from the image to the corrected image, based on the localization parameters corresponding to the preset number of reference points and coordinates of the preset number of reference points in the corrected image; and
   obtaining respective coordinates in the corrected image for all pixels of the image based on the spatial transformation relationship to obtain the corrected image.

3. The method according to claim 2, wherein determining the spatial transformation relationship for the reference points from the image to the corrected image, based on the localization parameters corresponding to the preset number of reference points and the coordinates of the preset number of reference points in the corrected image, comprises:
   obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm comprises one of an affine transformation algorithm, a perspective transformation algorithm or a thin plate spline transformation algorithm; and
   wherein obtaining the respective coordinates in the corrected image for all pixels of the image based on the spatial transformation relationship to obtain the corrected image, comprises:
   calculating, from coordinates of all the pixels of the image, the respective coordinates in the corrected image for all the pixels, by using the preset transformation algorithm with the transformation parameters to obtain the corrected image.

4. The method according to claim 1, wherein inputting the corrected image into the preset recognition network to obtain the object classification result for the image, comprises:
   performing feature extraction on the corrected image using convolutional layers in the preset recognition network to generate a feature map containing image features of the corrected image; and
   classifying the image features in the feature map of the corrected image using a fully connected layer in the preset recognition network to obtain the object classification result for the image.

5. An electronic device, which comprises a processor and a memory,
- the memory is configured to store a computer program; and
- the processor is configured to execute the computer program stored in the memory to carry out operations comprising:
- inputting an image into a preset localization network to obtain a plurality of localization parameters for the image, wherein the preset localization network comprises a preset number of convolutional layers, and wherein the plurality of localization parameters are obtained by regressing image features in a feature map that is generated from a convolution operation on the image;
- performing a spatial transformation on the image based on the plurality of localization parameters to obtain a corrected image; and
- inputting the corrected image into a preset recognition network to obtain an object classification result for the image,
- wherein the preset localization network and the preset recognition network correspond to a deformation type of the image, and
- wherein inputting the image into the preset localization network to obtain the plurality of localization parameters for the image, comprises:
- performing a feature extraction on the image using the preset number convolutional layers to generate the feature map containing the image features of the image; and
- regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

6. The electronic device according to claim 5, wherein performing the spatial transformation on the image based on the plurality of localization parameters to obtain the corrected image, comprises:
- determining a spatial transformation relationship for the reference points from the image to the corrected image, based on the localization parameters corresponding to the preset number of reference points and coordinates of the preset number of reference points in the corrected image; and
- obtaining respective coordinates in the corrected image for all pixels of the image based on the spatial transformation relationship to obtain the corrected image.

7. The electronic device according to claim 6, wherein determining the spatial transformation relationship for the reference points from the image to the corrected image, based on the localization parameters corresponding to the preset number of reference points and the coordinates of the preset number of reference points in the corrected image, comprises:
- obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm comprises one of an affine transformation algorithm, a perspective transformation algorithm or a thin plate spline transformation algorithm; and
- wherein obtaining the respective coordinates in the corrected image for all pixels of the image based on the spatial transformation relationship to obtain the corrected image, comprises:
- calculating, from coordinates of all the pixels of the image, the respective coordinates in the corrected image for all the pixels, by using the preset transformation algorithm with the transformation parameters to obtain the corrected image.

8. The electronic device according to claim 5, wherein inputting the corrected image into the preset recognition network to obtain the object classification result for the image, comprises:
- performing feature extraction on the corrected image using convolutional layers in the preset recognition network to generate a feature map containing image features of the corrected image; and
- classifying the image features in the feature map of the corrected image using a fully connected layer in the preset recognition network to obtain the object classification result for the image.

9. A non-transitory computer readable storage medium having stored thereon a computer program which, when executed by a processor, cause the processor to carry out operations comprising:
- inputting an image into a preset localization network to obtain a plurality of localization parameters for the image, wherein the preset localization network comprises a preset number of convolutional layers, and wherein the plurality of localization parameters are obtained by regressing image features in a feature map that is generated from a convolution operation on the image;
- performing a spatial transformation on the image based on the plurality of localization parameters to obtain a corrected image; and
- inputting the corrected image into a preset recognition network to obtain an object classification result for the image,
- wherein the preset localization network and the preset recognition network correspond to a deformation type of the image, and
- wherein inputting the image into the preset localization network to obtain the plurality of localization parameters for the image, comprises:
- performing a feature extraction on the image using the preset number convolutional layers to generate the feature map containing the image features of the image; and
- regressing the image features in the feature map of the image using a fully connected layer in the preset localization network, to obtain the plurality of localization parameters for the image; wherein the localization parameters are coordinates of pixels in the image, wherein image features of said pixels match with image features of a preset number of reference points in the corrected image.

10. The storage medium according to claim 9, wherein performing the spatial transformation on the image based on the plurality of localization parameters to obtain the corrected image, comprises:
- determining a spatial transformation relationship for the reference points from the image to the corrected image, based on the localization parameters corresponding to the preset number of reference points and coordinates of the preset number of reference points in the corrected image; and obtaining respective coordinates in the corrected image for all pixels of the image based on the spatial transformation relationship to obtain the corrected image.

11. The storage medium according to claim 10, wherein determining the spatial transformation relationship for the reference points from the image to the corrected image, based on the localization parameters corresponding to the preset number of reference points and the coordinates of the preset number of reference points in the corrected image, comprises:

obtaining transformation parameters required by a preset transformation algorithm for transforming the coordinates of the reference points in the image into the coordinates of the reference points in the corrected image, based on the localization parameters corresponding to the preset number of reference points and the coordinates of the preset number of reference points in the corrected image, wherein the preset transformation algorithm comprises one of an affine transformation algorithm, a perspective transformation algorithm or a thin plate spline transformation algorithm; and wherein obtaining the respective coordinates in the corrected image for all pixels of the image based on the spatial transformation relationship to obtain the corrected image, comprises:

calculating, from coordinates of all the pixels of the image, the respective coordinates in the corrected image for all the pixels, by using the preset transformation algorithm with the transformation parameters to obtain the corrected image.

12. The storage medium according to claim 9, wherein inputting the corrected image into the preset recognition network to obtain the object classification result for the image, comprises:

performing feature extraction on the corrected image using convolutional layers in the preset recognition network to generate a feature map containing image features of the corrected image; and classifying the image features in the feature map of the corrected image using a fully connected layer in the preset recognition network to obtain the object classification result for the image.

* * * * *